Figure 1:
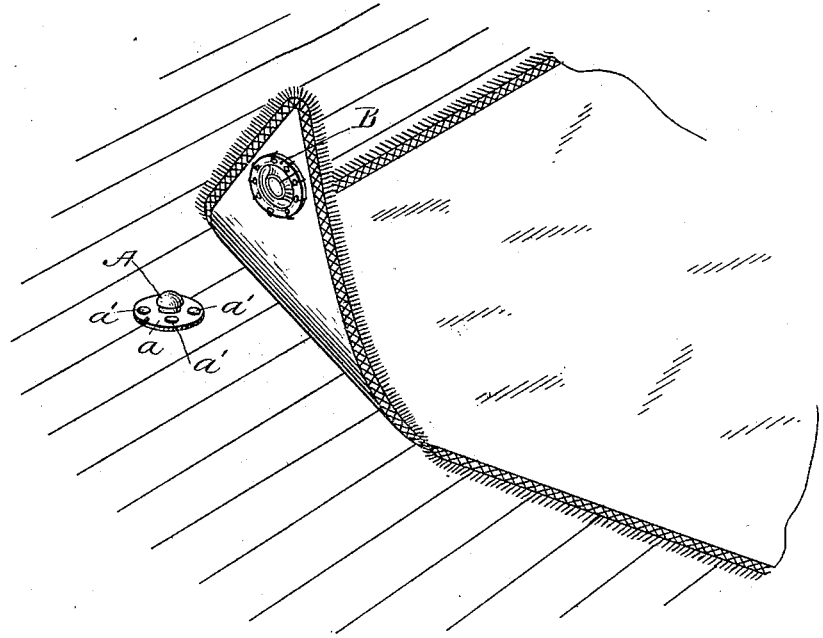

(No Model.)

W. S. RICHARDSON.
FASTENER.

No. 604,637. Patented May 24, 1898.

WITNESSES.

INVENTOR.

United States Patent Office.

WILLIAM S. RICHARDSON, OF BOSTON, MASSACHUSETTS, ASSIGNOR TO THE BALL AND SOCKET FASTENER COMPANY, OF SAME PLACE AND NASHUA, NEW HAMPSHIRE.

FASTENER.

SPECIFICATION forming part of Letters Patent No. 604,637, dated May 24, 1898.

Application filed June 20, 1895. Serial No. 553,399. (No model.)

*To all whom it may concern:*

Be it known that I, WILLIAM S. RICHARDSON, a citizen of the United States, residing at Boston, in the county of Suffolk and State of Massachusetts, have invented a new and useful Improvement in Fasteners, of which the following is a full, clear, and exact description, reference being had to the accompanying drawings, forming a part of this specification, in explaining its nature.

The fastener comprises two members, one of which is adapted to be engaged to the floor or other support for the rug, carpet, or other thing which it holds, and the other is adapted to be attached to the under surface of the rug, carpet, or other article to be attached or secured to the floor or other support. The first of these members comprises a ball or male member rising from a very wide or extended flat flange or base, the ball or male member rising up slightly from this support in order to form as little obstruction upon the floor as possible, the extended flange giving it a large base and also providing means by which it is secured in place to the floor or other support, the flange preferably having holes through which fastening tacks or nails may be driven or securing-stitches taken. The second or female member of the fastener is also made in one piece, and it has a wide or extended flange, which is preferably flat about its outer edge and near the center is formed to extend first upwardly and then downwardly to the socket-entrance, the upward bend being in the nature of an offset and the entrance to the socket being upon a line with the under side of the flange or slightly below it. The purpose of this construction is to form about the ball member when the parts are together a wall or supporting-section which will shield the ball and the socket-entrance from injury arising from stepping or walking upon it or other source, it being understood that the flange of this second member bears such relation to the flange of the ball member that when the two parts are together the flange of the second member is borne or supported upon the heads or projecting parts of the fastenings of the first member. The flange of the second member is also preferably provided with holes by which it may be attached to the carpet by threads sewed through the holes, or fastenings of any other nature may be used for attaching the flange to the under surface of the carpet, rug, or other thing. The engaging property of the fastener may reside in the ball or in the socket—that is, the ball may be a solid ball and the socket yielding or the socket may have an unyielding entrance and the ball have the yielding function.

Figure 2:
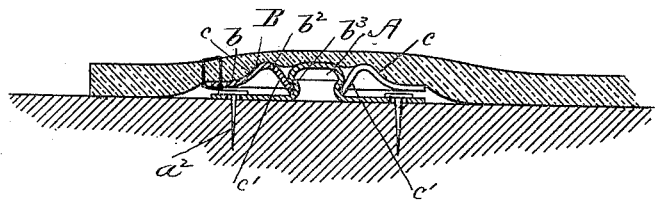
Figure 3:
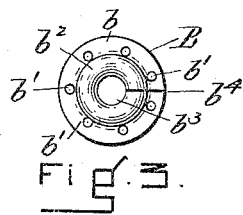
Figure 4:
Figure 5:
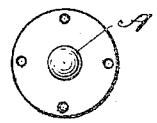

In the drawings, Figure 1 is a view of the two members of the fastener disengaged. Fig. 2 is an enlarged view in section engaged. Fig. 3 is a plan of this socket member. Fig. 4 is an enlarged sectional view of a slightly-modified form of the ball member. Fig. 5 is a plan view of the ball member.

A is the ball or male member. It is made of thin flat metal and has the extended flange $a$, in which are holes $a'$. The ball is of the character known as a "shallow" one—that is, it does not enter the other member of the fastener to any considerable extent and forms but a slight projection above the surface of the floor or other article to which it may be secured. In Fig. 2 I have shown this member as attached to the floor by tacks $a^2$, the shanks passing through the holes of the flange in the floor and the heads resting upon the upper surface of the flange.

B is the socket or female member. It has the extended flat flange or flange-section $b$, in which are holes $b'$, and the raised section $b^2$, made by forming upward and downward in a rounded form a section of the blank within the flange, and a socket-entrance $b^3$ upon the inner side of the wall or support $c$ and at the base or lower end of the inner section $c'$ thereof, the entrance to the socket being upon a line with or slightly below the under surface of the flange $b'$. The portion of the disk or blank which is struck or formed upwardly or outwardly I have lettered $c$ and the portion of the disk or blank which is bent or turned inwardly in a reverse direction and which extends to the socket-entrance I have lettered $c'$. It will be seen that these two parts $c\ c'$ are in cross-section like a frustum of a hollow cone, the upper part of which is folded or turned inward and downward into the cavity thereof. This construction surrounds the socket-entrance with a projecting wall or raised rib or bead, which is so arranged in relation to the flat section $b$ of the flange that when the flat section rests upon the flange of the male member or the fastenings which secure the male member to the floor the ball of the ball member, which is of a height approximately equal to the height of the wall, is shielded or protected from being disfigured or having its shape changed, and the entrance to the socket is also protected, so that no change in its shape may take place, the projecting wall acting to receive the pressure of the foot in stepping or walking upon the fastener and being sufficiently stiff and rigid to hold its shape under such strain. In Figs. 1 and 2 I have represented this section of the member as secured to the under surface of a rug or carpet by stitches passed through the holes therein and into the rug or carpet, and in Fig. 2 I have shown a section of a rug or carpet as attached to the floor by this fastener.

In the drawings I have shown the ball member as unyielding and the socket member as yielding, the yielding property being provided the socket member by a slit $b^4$, extending across the wall and flange, (see Fig. 3;) but, as above expressed, the engagement of the two parts may be provided by making the ball member yielding. I would say that the fastener may be used for any other purpose than those named without departing from the spirit of the invention.

In Fig. 4 I have shown the ball member as having a flange provided with raised sections upon which the flange of the other member may rest, the said raised sections taking the place of the heads of the fastenings.

It will be observed that the form of the socket member is such that the size of its entrance is maintained and prevented from being injured when disengaged from the ball; also, that its metal is disposed in a desirable form for providing the socket with a desirable spring action in relation to the flange; also, that the socket-entrance is so disposed in relation to the flange as to exert the best lateral draft on the ball member.

While the two members are represented as having a circular shape, I would not be understood as limiting them to such a shape, as they may be rectangular or of any other desired form, and the ball member may have struck from its flange, if desired, prongs by which it may be secured in place.

It will be seen that the fastener is so organized or constructed as to be very thin when its parts are together, and one of the principal purposes of the invention is to provide a fastener for securing rugs or carpets to floors or parts of garments together which shall not indicate, by any exposed fastening means upon the surface opposite that to which its members are applied or by any unusual bulge of the fabric to which it is secured, its presence. For this reason and for the reason that the two parts make direct engagement without a preliminary lateral movement of one with relation to the other it is especially well adapted, when used on garments, to take the place of hooks and eyes. It is made thin, because the socket part is of one piece of metal and shallow, enabling a shallow ball to be used with it, the socket member having a fastening-flange and a wall which is at practically a right angle to the flange, which wall forms a stud-containing cavity open at both ends and a socket-entrance which is substantially in line with the flange. I mean by "substantially in line" either exactly in line with it or sufficiently in line with it not to cause a substantial increase of the thickness of the parts when together because of any slight variation from the position of the socket-entrance. This location of the socket-entrance, the shallowness of the wall, the fact that there are no metal parts interposed between the wall and the fabric to which the member is secured, and the fact that it is directly attached to the fabric without the interposition of any plate enable the member to be made very thin, and yet at the same time to be readily set or engaged to the ball member by the pressure of the thumb or finger, as the wall projects inwardly from the flange sufficiently to form, with the fabric to which it is secured, the pressure-receiving bearing during the act of engaging it to the other member. In thin fasteners especially it is desirable that the draft of the two members should not operate to tip either member, and thus disengage them, but rather it should be so as to maintain them upright and in true engaging relation with each other. This result is obtained by providing the engaging parts—viz., the stud and the thin edge of the socket-entrance, which is drawn against the stud—with body portions which are rigid with the parts, are, in the main, straight and closely parallel with each other, and one or both of which are so shaped adjacent to the engaging parts as to cause the line of draft of the members to be on a plane parallel with said flat sections of the body portions, while at the same time a chamber or cavity for the ball is provided and retaining resiliency given one or the other of the engaging parts.

The section or wall $b^2$ provides the socket member of the fastener with a raised portion which is of use also in pressing the socket member upon the ball member by means of the thumb or finger.

It will be observed that the fastener as a whole consists of two parts, each of which is made from a single piece of flat metal; that one piece (the socket member) has a socket-entrance which is substantially in line with its attaching-flange, thus securing to the complete fastener proper draft; also, that it has a raised section which not only protects the ball member and gives increased resiliency to the spring of the socket-entrance when said spring resides in the socket member of the fastener, but which also acts as a means by which the socket member may be more readily pressed by the thumb or finger upon the ball member.

Having thus fully described my invention, I claim and desire to secure by Letters Patent of the United States—

1. The combination of a socket member having a fastening-flange, a wall surrounded by the flange and integral therewith, which wall forms a cavity open at both ends and provides a yielding socket-entrance, and a flexible fabric to one surface of which the fastening-flange is secured, and which fabric covers the said cavity opposite the socket-entrance and is held from said socket-entrance by the wall, and which fabric and wall forms a bearing, raised from the socket-entrance, for the thumb or finger used in holding or pressing said socket member while it is being engaged by or with its coöperating member.

2. The combination of a socket member of a fastener having a fastening-flange, a wall at an angle to said flange surrounded by and integral with the flange, forming a cavity or chamber open at both ends and a socket-entrance, flexible fabric to which the said member is secured by said flange, and which fabric is held from the socket-entrance by said wall and closes one end of said cavity, with a ball member having a flange by which it is secured to its support or material, and said support or material; the said socket and ball members being secured to the opposing faces of the fabrics or parts which they unite without perforating said fabrics or parts and without interposing any substance between the ball and the fabric with which it is united by the socket member.

3. A socket member of a fastener consisting of a single piece of metal having a fastening-flange adapted to lie against the surface of the fabric or material to which the member is to be attached, a wall integral with said flange and forming a stud-containing cavity open at both ends, and which wall provides, first, a socket-entrance, second, a means for holding the fabric from the socket-entrance, and, third, a pressure-receiving bearing, as and for the purposes set forth.

4. A complete socket member of a fastener consisting of a single piece of metal, having an attaching-flange, a socket-entrance substantially in line with said flange and a wall or raised section surrounding said socket-entrance.

5. A complete socket member of a fastener consisting of only one piece of metal having an attaching-flange, a socket-entrance substantially in line therewith, a raised section about said socket-entrance, and a slit $b^4$ extending from the socket-entrance through the raised section or wall and flange.

6. A complete socket member of a fastener consisting of only one piece of metal and having the flange $b$ provided with holes $b'$, the continuous socket-entrance $b^3$ and the interposed raised section or wall $b^2$, as and for the purposes described.

7. A complete socket member of a fastener consisting of a single piece having an attaching-flange adapted to be united to a surface of the fabric or material with which it is used, an integral continuous wall extending first upward therefrom and then downward, to provide a socket-entrance substantially in line with the flange, said wall serving as a means for holding the fabric or material above or away from the socket-entrance and thereby establishing a ball-receiving cavity above said entrance.

8. A complete socket member of a fastener consisting of a single piece of metal having an attaching-flange and a continuous raised wall or bead within said flange and the inner depending part of which wall or bead extends downward so as to form a socket-entrance substantially in line with the said flange, said wall or bead serving to hold the fabric or material above or away from the socket-entrance, to provide a ball-receiving cavity, combined with a ball member consisting also of a single piece of metal and also having an attaching-flange, one of said members being formed resilient so that they will be elastically and detachably connected when engaged, and the ball of said ball member being of a height approximately equal to the height of said wall so that the top of said ball will not project materially above the top of said wall or bead when the two members of the fastening are engaged.

WILLIAM S. RICHARDSON.

Witnesses:
F. F. RAYMOND, 2d,
J. M. DOLAN.